(12) United States Patent
Liu et al.

(10) Patent No.: US 10,849,032 B2
(45) Date of Patent: Nov. 24, 2020

(54) USING GEO-LOCATION INFORMATION TO SUSPEND HOME NETWORK SCANNING IN WIRELESS COMMUNICATION NETWORKS

(71) Applicant: T-Mobile USA, Inc., Bellevue, WA (US)

(72) Inventors: Jun Liu, Issaquah, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 29 days.

(21) Appl. No.: 16/212,250

(22) Filed: Dec. 6, 2018

(65) Prior Publication Data

US 2020/0187066 A1 Jun. 11, 2020

(51) Int. Cl.
*H04W 36/00* (2009.01)
*H04W 52/02* (2009.01)
*H04W 4/029* (2018.01)
*H04W 88/02* (2009.01)

(52) U.S. Cl.
CPC ....... *H04W 36/0083* (2013.01); *H04W 4/029* (2018.02); *H04W 52/0251* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 6,167,268 A | * | 12/2000 | Souissi | H04W 48/16 455/434 |
| 8,442,516 B2 | * | 5/2013 | Swaminathan | H04W 48/16 455/423 |
| 2015/0163625 A1 | * | 6/2015 | Saida | H04W 4/029 455/456.1 |
| 2015/0181486 A1 | * | 6/2015 | Vallabhu | H04W 36/18 370/331 |
| 2016/0157150 A1 | * | 6/2016 | Wirtanen | H04W 48/16 455/434 |
| 2016/0249294 A1 | * | 8/2016 | Lee | H04W 52/0251 |
| 2020/0029271 A1 | * | 1/2020 | Sood | H04B 17/318 |

* cited by examiner

*Primary Examiner* — German Viana Di Prisco
(74) *Attorney, Agent, or Firm* — Lee & Hayes, P.C.

(57) ABSTRACT

A method of using geo-location information to suspend home network scanning in wireless communication networks is discussed herein. The method includes obtaining, by a mobile device, service from a first wireless communication network that is different from a second wireless communication network. The method further includes, based at least in part on the obtaining service from the first wireless communication network, scanning, by the mobile device, for the second wireless communication network. The method also includes determining, by the mobile device, a location of the mobile device and, based at least in part on the location, determining, by the mobile device, a distance of the mobile device from the second wireless communication network. Based at least in part on the distance, the mobile device delays or suspends further scanning, by the mobile device, for the second wireless communication network for at least a predetermined amount of time.

20 Claims, 6 Drawing Sheets

USING GEO-LOCATION INFORMATION TO SUSPEND HOME NETWORK SCANNING IN WIRELESS COMMUNICATION NETWORKS

BACKGROUND

In recent years, mobile telecommunication devices have advanced from offering simple voice calling services within wireless communication networks to providing users with many new features. Mobile telecommunication devices (also referred to herein as mobile devices and user equipment (UEs)) now provide messaging services such as email, text messaging, and instant messaging; data services such as Internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

Users often subscribe to obtain wireless services from an operator of a wireless communication network, which may be referred to as a "home" wireless communication network. The home wireless communication network may cover one or more specific geographic regions. However, users of mobile telecommunication devices often move around such that the users may leave a geographic region covered by the home wireless communication network and end up roaming, e.g., the users end up in a geographic region where wireless services are provided by an operator of another wireless communication network. Thus, to continue to maintain wireless services for the mobile telecommunication devices as the mobile telecommunication devices move around, operators of wireless communication networks often contract with operators of other wireless communication networks so that users of mobile telecommunication devices continue to receive wireless services even when they are not located within the home wireless communication network, e.g., when the mobile telecommunication devices are roaming. An operator of a wireless communication network often charges roaming fees to other operators of wireless communication networks when subscribers of the other operators' wireless communication networks use that operator's wireless communication networks to obtain wireless services while roaming.

Under many plans offered by operators of wireless communication networks, roaming fees are not passed on to the subscribers of the wireless communication networks when roaming, e.g., the users are not charged. Thus, operators of wireless communication networks prefer for subscribers to obtain wireless services while within the subscribers' home wireless communication network. Accordingly, when wireless telecommunication devices are roaming and obtaining wireless services from another wireless communication network, once the wireless telecommunication device realizes that it is roaming and obtaining wireless services from a "non-home" wireless communication network, the wireless telecommunication device will periodically scan for the home wireless communication network in order to determine if the wireless telecommunication device is now capable of receiving wireless services from the home wireless communication network. However, such periodic scanning may be a drain on the battery of the wireless telecommunication device and thus, may inhibit performance of the wireless telecommunication device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
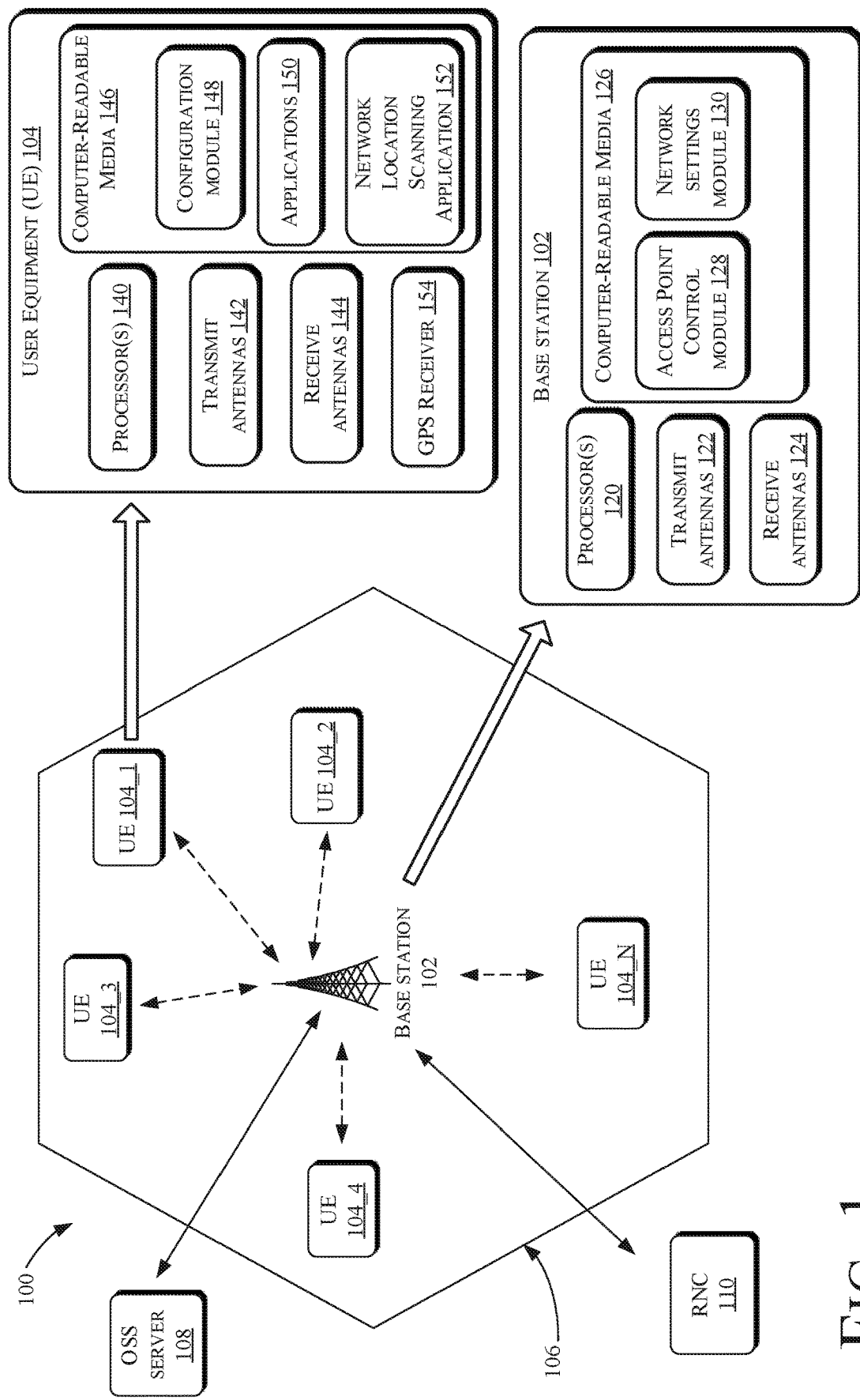
FIG. 1 schematically illustrates a macro cell of a wireless communication network, in accordance with various configurations.

Described herein are wireless communication networks and mobile devices for use in the wireless communication networks that include techniques and architecture for using geo-location information to suspend home network scanning in wireless communication networks. In general, the techniques and architecture determine a location of mobile devices with respect to a home wireless communication network when the mobile devices are roaming. Based upon the determined location, scanning for the home wireless communication network may be delayed or suspended.

As previously noted, when a mobile device leaves a home wireless communication network and registers with another wireless communication network for services, that wireless communication network may charge roaming fees. Under many plans, the operator of the home wireless communication network does not pass the roaming fees on to the user of the mobile device. Thus, the operator of the home wireless communication network prefers that users obtain services with their mobile devices from the home wireless communication network. Thus, when a mobile device starts roaming and obtains services from a non-home wireless communication network, the mobile device may activate software or firmware that begins scanning for the home wireless communication network. The pattern of scanning for the home wireless communication network may be frequent and thus, such scanning may be draining on a battery of the mobile device, thus potentially harming performance of the mobile device.

Thus, in configurations, a mobile device may include a network location scanning application implemented via software or firmware that may be used to control scanning for a home wireless communication network when a mobile device is obtaining services by roaming within a non-home wireless communication network. For example, once the mobile device begins roaming, the mobile device may scan for the home wireless communication network. The scanning for the home wireless communication network may be automatic, based upon the roaming, e.g., may be automatically initiated due to the mobile device leaving the home wireless communication network, which, in configurations, may be based upon geo-fencing and/or registering with a non-home wireless communication network.

Once the mobile device scans for the home wireless communication network, the network location scanning application may determine a location of the mobile device. The location may be determined based upon, for example, a Global Positioning System (GPS) receiver included within the mobile device, observed time difference of arrival (OT-DOA), etc. Based upon the determined location, the network location scanning application may determine that the mobile device is close to a border between the home wireless communication network and the non-home wireless communication network. For example, it may be determined that the mobile device is within, for example, a range of 1 to 10 miles of the border. In configurations, the border may be derived via an algorithm, e.g., using geofencing polygons. Thus, the network location scanning application may continue to periodically rescan for the home network in order to determine if the mobile device has reentered the home wireless communication network and can thus register with the home wireless communication network to receive services.

However, in configurations, if the network location scanning application determines that the mobile device is a large distance away from the home wireless communication network, for example, 100 miles or more from the wireless communication network, then the network location scanning application may alter a periodicity or frequency of rescanning for the home wireless communication network. For example, the network location scanning application may wait for two to three hours before rescanning for the home wireless communication network since to travel 100 or more miles may take at least that long. Additionally, in configurations, the network scanning location application may determine a new location of the mobile device after a period of two to three hours to see if the mobile device has moved any closer to the home wireless communication network. If not, then the network location scanning application may further delay or suspend the time for rescanning for the home wireless communication network due to the mobile device not being any closer to the home wireless communication network and/or actually being farther away from the home wireless communication network.

As a further example, the network location scanning application may determine that the mobile device is located, for example, in Europe while the home wireless communication network is located in various areas of the United States. Thus, the network location scanning application may delay or suspend scanning for the home wireless communication network for a predetermined amount of time that may be based upon an estimated time for the mobile device to move from Europe to the United States. After the predetermined amount of time, the network location scanning application may determine the location of the mobile device and determine that the mobile device is still located in Europe. Thus, the network location scanning application may delay or suspend rescanning for the home wireless communication network for the predetermined amount of time once again. Additionally, if the network location scanning application determines that the mobile device has actually moved farther from the home wireless communication network, e.g., moved from France to Germany, the delay in rescanning for the home wireless communication network may be set at a second predetermined amount of time that is greater than the first predetermined amount of time. Likewise, if the network location scanning application determines that the mobile device has moved closer to the home wireless communication network, e.g., moved from France to the U.K., then the time set for a potential next rescanning for the home wireless communication network may be set at a third predetermined amount of time that is less than the first predetermined amount of time.

In configurations, prior to the expiration of the first predetermined amount of time, the mobile device may power-off or may change from an active mode of operation, e.g., a mode of operation where the mobile device is actively operating or in between active operations, to a sleep mode or inactive mode of operation, e.g., a mode of operation where the mobile device is not actively operating and/or has not been actively operating for a predefined amount of time (also known as a low power mode of operation). When the mobile device powers-on again or changes back to the active mode of operation, the network location scanning application may determine the location of the mobile device and determine that the mobile device is still located in Europe. Thus, the network location scanning application may delay or suspend rescanning for the home wireless communication network for the predetermined amount of time once again. Additionally, if the network location scanning application determines that the mobile device has actually moved farther from the home wireless communication network, e.g., moved from France to Germany, the delay in rescanning for the home wireless communication network may be set at a second predetermined amount of time that is greater than the first predetermined amount of time. Likewise, if the network location scanning application determines that the mobile device has moved closer to the home wireless communication network, e.g., moved from France to the U.K., then the time set for a potential next rescanning for the home wireless communication network may be set at a third predetermined amount of time that is less than the first predetermined amount of time.

When a mobile device is roaming, there may be multiple choices of wireless communication networks that may be chosen for providing wireless services to the mobile device while the mobile device is roaming, e.g., portions of wireless communication networks may overlap. Thus, the techniques previously described may be used to select preferred wireless communication networks for providing wireless services to the mobile device while the mobile device is roaming. For example, a first wireless communication network may overlap with a second wireless communication network, where the second wireless communication network is preferred for providing wireless services to the mobile device while roaming. If the mobile device is within the first wireless communication network and receiving mobile services, the network location scanning application may determine a location of the mobile device to determine how far away the mobile device is from the second wireless communication network in order to determine when to begin scanning for the second wireless communication network. A list of preferred wireless communication networks for use while mobile devices are roaming may be provided by an operator of the home wireless communication network to the mobile device, which may store the list of preferred roaming wireless communication networks. The operator of the home wireless communication network may periodically update the list of preferred roaming wireless communication networks when the list changes.

In configurations, the network location scanning application may perform the scanning and rescanning for the home wireless communication network and/or the preferred roaming wireless communication networks. In some configurations, the network location scanning application may control an existing home network scanning application included in either firmware or software on the mobile devices. The control of such a home network scanning application may be based upon determined locations with respect to the mobile device with respect to the home wireless communication network as previously described.

FIG. 1 illustrates an example wireless communication network 100 (also referred to herein as network 100). The network 100 comprises a base station (BS) 102 communicatively coupled to a plurality of user devices or user equipment, referred to as user equipment (UE) 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and, thus, the wireless communication network 100 may be divided into four regional subnetworks, where each regional subnetwork includes multiple macro cells 106 that may be divided into small cells.

In a configuration, the UEs 104_1, . . . , 104_N may comprise any appropriate devices, e.g., stationary devices, portable electronic devices, or mobile devices, for communicating over a wireless communication network. Such devices include mobile telephones, cellular telephones, IP telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded Global Positioning System (GPS) receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In a configuration, the BS 102 may communicate voice traffic and/or data traffic with one or more of the UEs 104_1, . . . , 104_N using RF signals. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an operation support subsystem (OSS) server 108, a radio network controller (RNC) 110, and/or the like. The RNC 110 can also be in the form of a mobility management entity that serves as a gateway when the wireless communication network 100 operates according to the LTE standard or LTE Advanced standard.

In a configuration, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some configurations, the processor(s) 120 are a central processing unit (CPU), a graphics processing unit (GPU), or both CPU and GPU, or any other sort of processing unit. The base station 102 can also be in the form of, for example, a Node B (where the wireless communication network 100 is 3G UMTS network), in the form of an eNode B (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In a configuration, the antennas 122 and 124 may be included in a transceiver component of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disc read-only memory ("CD-ROM"), digital versatile discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processor(s) 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other configurations, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In a configuration, the UEs 104 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some configurations, the processor(s) 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In a configuration, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processor(s) 140. For instance, the computer-readable media 146 may store a configuration module 148. In configurations, the computer-readable media 146 may also store one or more applications 150 configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.). The applications 150 may also include third-party applications that provide additional functionality to the UE 104. In a configuration, the UE 104 includes a network location scanning application 152, as will be described further herein. In configurations, the UE 104 may also comprise a GPS receiver 154 and/or another location determination component.

Although not illustrated in FIG. 1, the UEs 104 may also comprise various other components, e.g., a battery, a charging unit, one or more network interfaces, an audio interface, a display, a keypad or keyboard, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration module.

In a configuration, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In a configuration, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2A:
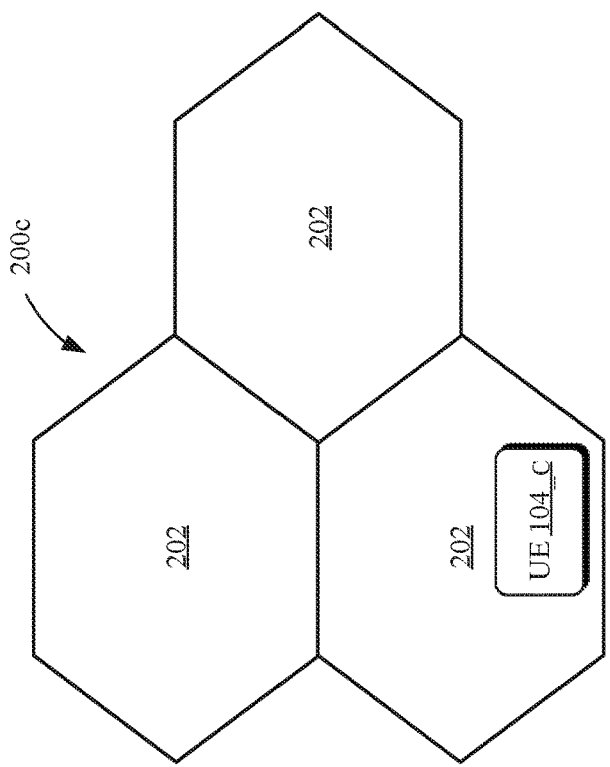
FIGS. 2A and 2B schematically illustrate arrangements of multiple wireless communication networks comprising microcells at least similar to the macro cell of the wireless communication network of FIG. 1, in accordance with various configurations.
Figure 2A:
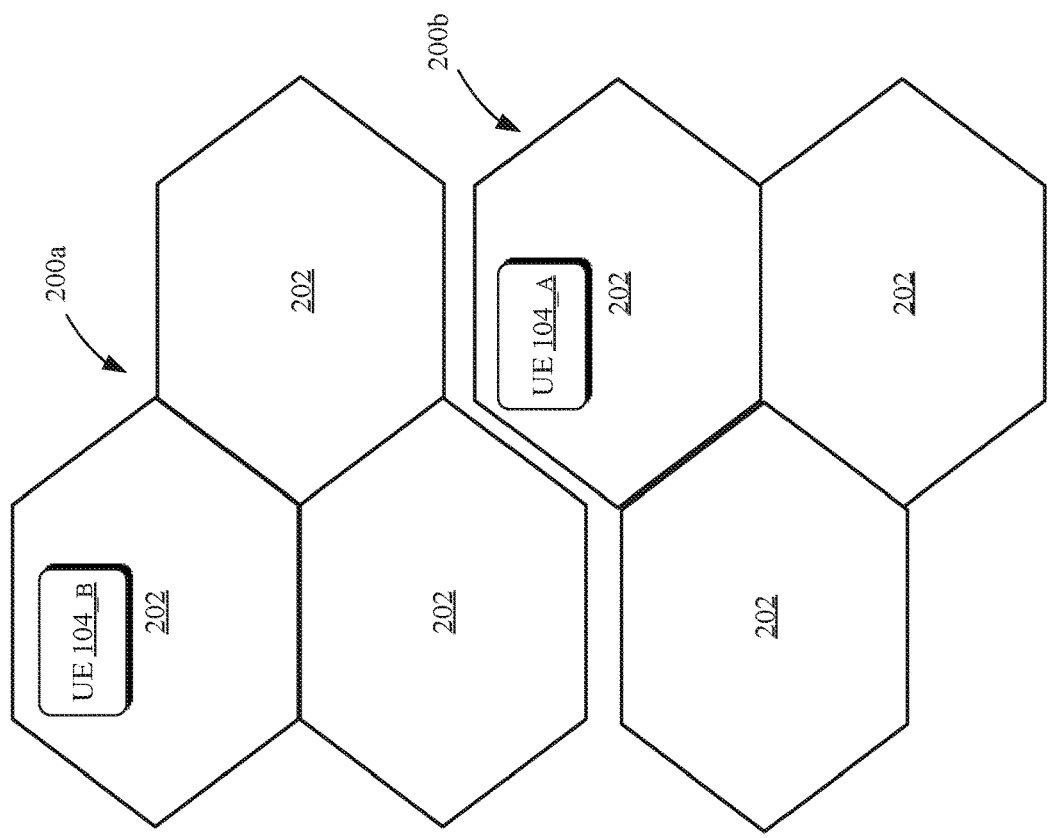

FIG. 2A schematically illustrates an arrangement of a plurality of wireless communication networks 200a, 200b and 200c comprising macrocells 202 at least similar to the macro cell 106 of the wireless communication network of FIG. 1. A first wireless communication network 200a may be defined as a home wireless communication network 200a for UEs 104 illustrated in FIG. 2, e.g., the UEs 104 have subscribed for wireless services with an operator of the wireless communication network 200a. Thus, the other wireless communication networks 200b and 200c are non-home wireless communication networks, e.g., UEs 104 receiving wireless services within the wireless communication networks 200b and 200c are roaming and thus, subject to roaming fees charged by the operators of wireless communication networks 200b and 200c, respectively. The roaming fees may or may not be passed on to the UEs 104 by the operator of the wireless communication network 200a depending on plans of service subscribed to by users of the UEs 104 when subscribing for wireless services from the wireless communication network 200a.

While only 3 wireless communication networks 200a, 200b and 200c are illustrated in FIG. 2A, more wireless communication networks 200 do exist. Additionally, while gaps are shown between the wireless communication networks for clarity, this may or may not be the case Also, while UEs 104 illustrated in FIG. 2 subscribe for wireless services with an operator of the wireless communication network 200a, other UEs 104 (not illustrated in FIG. 2) may subscribe for wireless services with an operator of either wireless communication network 200b or 200c, e.g., such UEs 104 receiving wireless services within the wireless communication network 200a would be roaming and thus, subject to roaming fees charged by the operator of wireless communication network 200a.

In configurations, the UEs 104 may include the network location scanning application 152 implemented via software or firmware that may be used to control scanning for the home wireless communication network 200a when the UEs 104 are obtaining services by roaming within one of the non-home wireless communication network 200b and 200c. For example, once a UE 104a begins roaming in wireless communication network 200b, the UE 104a may scan for the home wireless communication network 200a. The scanning for the home wireless communication network 200a may be automatic, based upon the roaming, e.g., may be automatically initiated due to the UE 104a leaving the home wireless communication network 200a, which, in configurations, may be based upon geo-fencing and/or registering with the non-home wireless communication network 200b.

Once the UE 104a scans for the home wireless communication network 200a, the network location scanning application 152 may determine a location of the UE 104a. The location may be determined based upon, for example, the GPS receiver 154 included within the UE 104a, observed time difference of arrival (OTDOA), etc. Based upon the determined location, the network location scanning application 152 may determine that the UE 104a is close to a border between the home wireless communication network 200a and the non-home wireless communication network 200b. For example, it may be determined that the UE 104a is within, for example, a range of 1 to 10 miles of the border between the home wireless communication network 200a and the non-home wireless communication network 200b. In configurations, the border may be derived via an algorithm, e.g., using geofencing polygons. Thus, the network location scanning application 152 may continue to periodically rescan for the home wireless communication network 200a in order to determine if the UE 104a has reentered the home wireless communication network 200a and can thus register with the home wireless communication network 200a to receive wireless services.

However, in configurations, if the network location scanning application 152 determines that the UE 104a is a large distance away from the home wireless communication network 200a, for example, 100 miles or more from the border between the home wireless communication network 200a and the non-home wireless communication network 200b, then the network location scanning application 152 may alter a periodicity or frequency of rescanning for the home wireless communication network 200a.

For example, a UE 104b is located within the wireless communication network 200b. If the network location scanning application 152 of UE 104b determines that the UE 104b is a large distance away from the home wireless communication network 200a, for example, 100 miles or more from the home wireless communication network 200a, then the network location scanning application 152 may alter a periodicity or frequency of rescanning for the home wireless communication network 200a. For example, the network location scanning application 152 may wait for two to three hours before rescanning for the home wireless communication network 200a since to travel 100 or more miles may take at least that long. Additionally, in configurations, the network location scanning application 152 may determine a new location of the UE 104b after a period of two to three hours to see if the UE 104b has moved any closer to the home wireless communication network 200a. If not, then the network location scanning application 152 may further delay or suspend the time for rescanning for the home wireless communication network 200a due to the UE 104b not being any closer to the home wireless communication network 200a and/or actually being farther away from the home wireless communication network 200a.

As a further example, the network location scanning application 152 of a UE 104c may determine that the UE 104c is located, for example, in a wireless communication network 200c in Europe while the home wireless communication network 200a is located in various areas of the United States. Thus, the network location scanning application 152 may delay or suspend scanning for the home wireless communication network 200a for a predetermined amount of time that may be based upon an estimated time for the UE 104c to move from Europe to the United States, e.g., from the wireless communication network 200c to the wireless communication network 200a. After the predetermined amount of time, the network location scanning application 152 may determine the location of the UE 104c and determine that the UE 104c is still located in Europe. Thus, the network location scanning application 152 may delay or suspend rescanning for the home wireless communication network 200a for the predetermined amount of time once again. Additionally, if the network location scanning application 152 determines that the UE 104c has actually moved farther from the home wireless communication network 200a within Europe, e.g., moved from France to Germany, the delay in rescanning for the home wireless communication network 200a may be set at a second predetermined amount of time that is greater than the first predetermined amount of time. Likewise, if the network location scanning application 152 determines that the UE 104c has moved closer to the home wireless communication network 200a, e.g., moved from France to the U.K., then the time set for a potential next rescanning for the home wireless communication network 200a may be set at a third predetermined amount of time that is less than the first predetermined amount of time.

In configurations, prior to the expiration of the first predetermined amount of time, the UE 104c may power-off or may change from an active mode of operation, e.g., a mode of operation where the UE 104c is actively operating or in between active operations, to a sleep mode or inactive mode of operation, e.g., a mode of operation where the UE 104c is not actively operating and/or has not been actively operating for a predefined amount of time (also known as a low power mode of operation). When the UE 104c powers-on again or changes back to the active mode of operation, the network location scanning application 152 may determine the location of the UE 104c and determine that the UE 104c is still located in Europe. Thus, the network location scanning application 152 may delay or suspend rescanning for the home wireless communication network 200a for the predetermined amount of time once again. Additionally, if the network location scanning application 152 determines that the UE 104c has actually moved farther from the home wireless communication network 200a, e.g., moved from France to Germany, the delay in rescanning for the home wireless communication network 200a may be set at a second predetermined amount of time that is greater than the first predetermined amount of time. Likewise, if the network location scanning application 152 determines that the mobile device has moved closer to the home wireless communication network 200a, e.g., moved from France to the U.K., then the time set for a potential next rescanning for the home wireless communication network 200a may be set at a third predetermined amount of time that is less than the first predetermined amount of time.

Figure 2B:
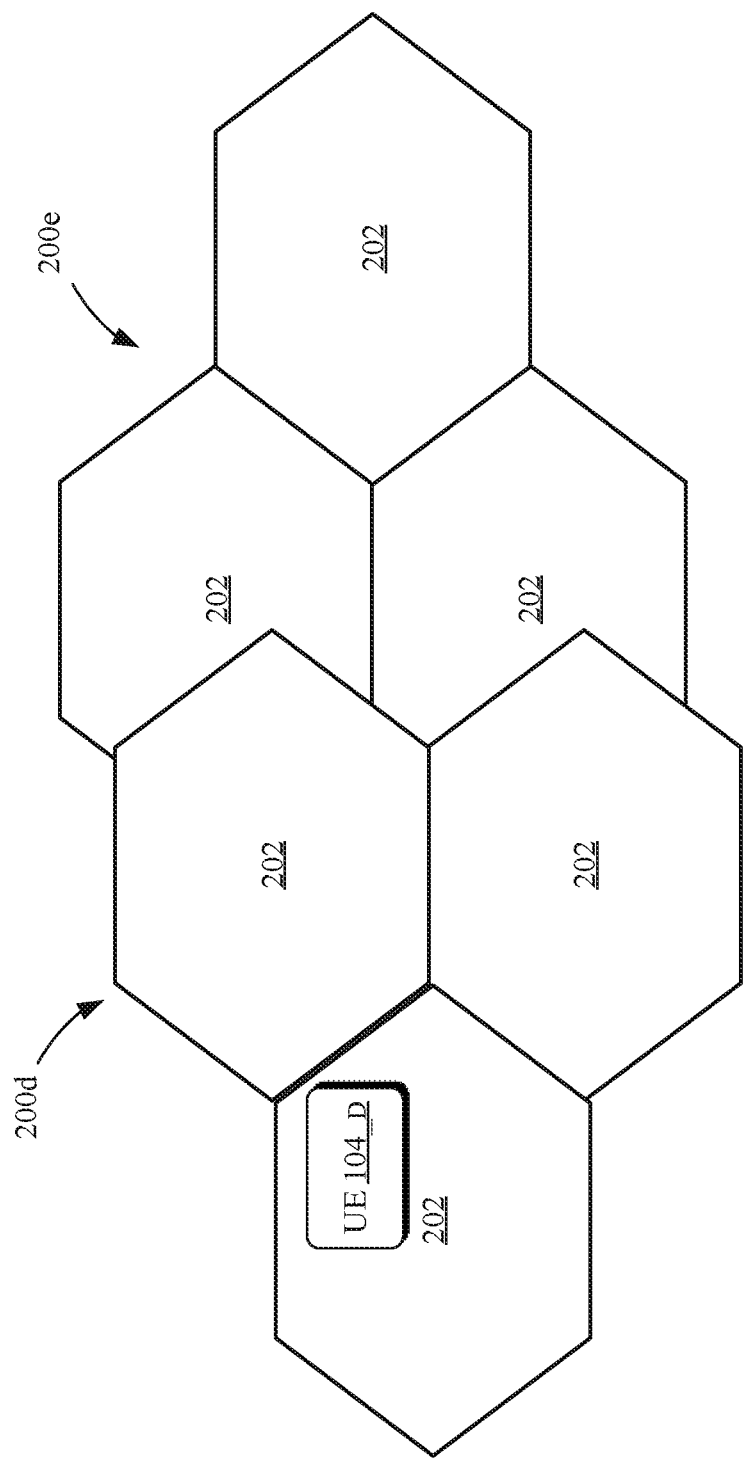

Referring to FIG. 2B, when a UE 104d is roaming, there may be multiple choices of wireless communication networks 200 that may be chosen for providing wireless services to the UE 104 while the mobile device is roaming, e.g., portions of wireless communication networks 200 may overlap. Thus, the techniques previously described may be used to select preferred wireless communication networks 200 for providing wireless services to the UE 104d while the UE 104d is roaming. For example, a first wireless communication network 200d may overlap with a second wireless communication network 200e, where the second wireless communication network 200e is preferred for providing wireless services to the UE 104d while roaming. If the UE 104d is within the first wireless communication network 200d and receiving wireless services, the network location scanning application 152 may determine a location of the UE 104d to determine how far away the UE 104d is from the second wireless communication network 200e in order to determine when to begin scanning for the second wireless communication network 200e. A list of preferred wireless communication networks 200 for use while UEs 104 are roaming may be provided by an operator of the home wireless communication network 200a, e.g., via the OSS server 108 or the RNC 110, to the UEs 104, which may store the list of preferred roaming wireless communication networks 200. The operator of the home wireless communication network 200a may periodically update the list of preferred roaming wireless communication networks 200 when the list changes.

In configurations, the network location scanning application 152 may perform the scanning and rescanning for the home wireless communication network 200a and/or the preferred roaming wireless communication networks 200. In some configurations, the network location scanning application 152 may control an existing home network scanning application included in either firmware or software on the UEs 104, e.g., legacy UEs 104. The control of such a home network scanning application may be based upon determined locations with respect to the UEs 104 with respect to the home wireless communication network 200a and preferred roaming wireless communication networks 200, as previously described.

Figure 3:
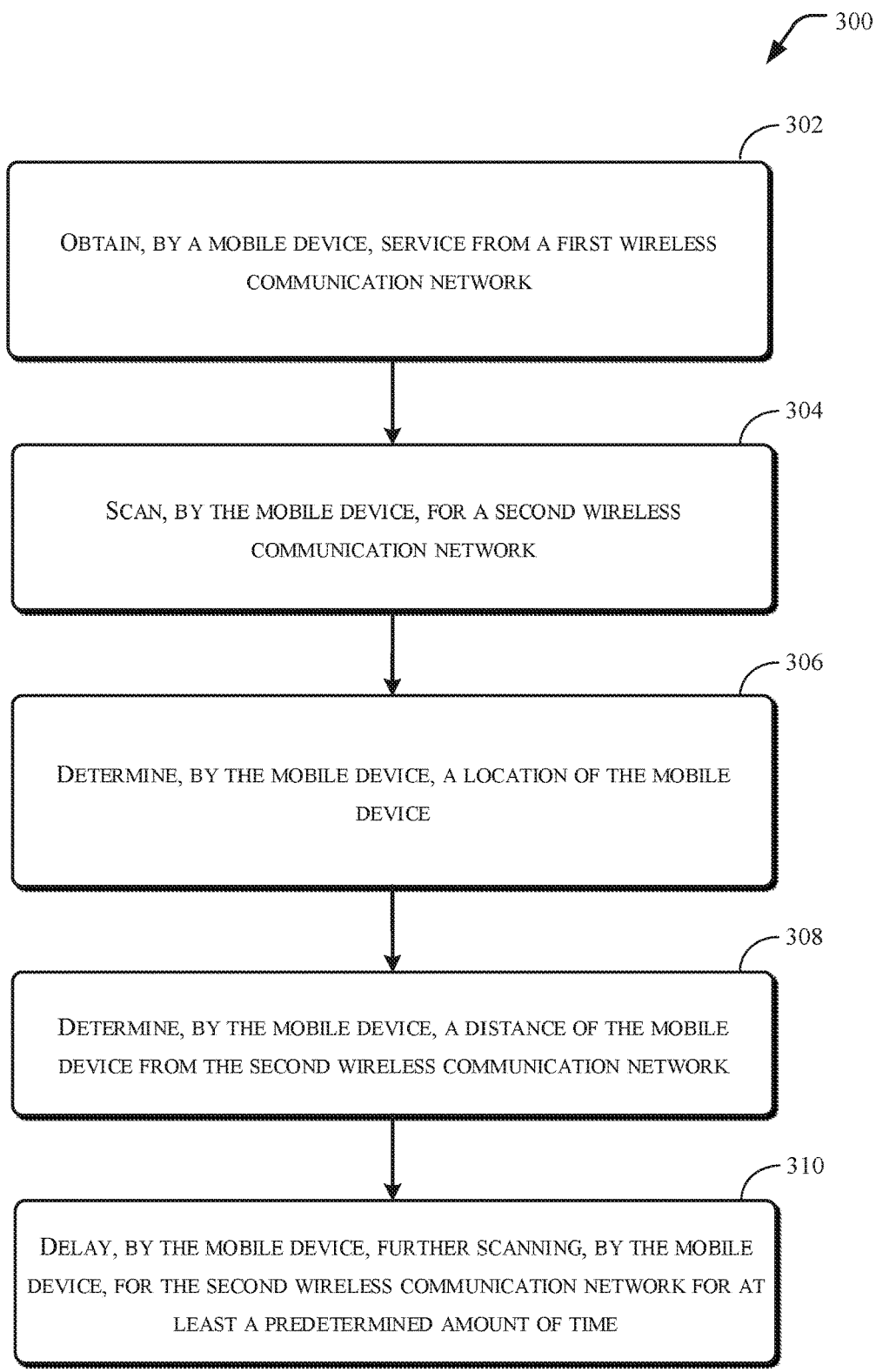
FIG. 3 is a flowchart illustrating an example method of managing scanning for a home wireless communication network when a mobile device, e.g., UE 104, is roaming, in accordance with various configurations.

FIG. 3 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flow diagram illustrating method 300 of managing scanning for a home wireless communication network when a mobile device, e.g., UE 104, is roaming. As illustrated, at block 302, service is obtained by a mobile device from a first wireless communication network, e.g., wireless communication network 200b. In configurations, the first wireless communication network is different from a second wireless communication network. At block 304, the mobile device scans for a second wireless communication network, e.g., home wireless communication network 200a. For example, the scanning may be based at least in part on the obtaining service from the first wireless communication network and may be performed by the network location scanning application 152 of the mobile device.

At block 306, the mobile device determines a location of the mobile device. For example, the network location scanning application 152 may use the GPS receiver 154, OTDOA, etc., to determine the location of the mobile device. At block 308, a distance of the mobile device from the second wireless communication network is determined by the mobile device. For example, the network location scanning application 152 may determine a distance of the mobile device from the second wireless communication network based at least in part on the determined location. At block 310, the mobile device delays further scanning for the second wireless communication network for at least a predetermined amount of time. For example, the network location scanning application 152 may delay or suspend further scanning for the second wireless communication network for at least a predetermined amount of time based at least in part on the determined distance.

Figure 4:
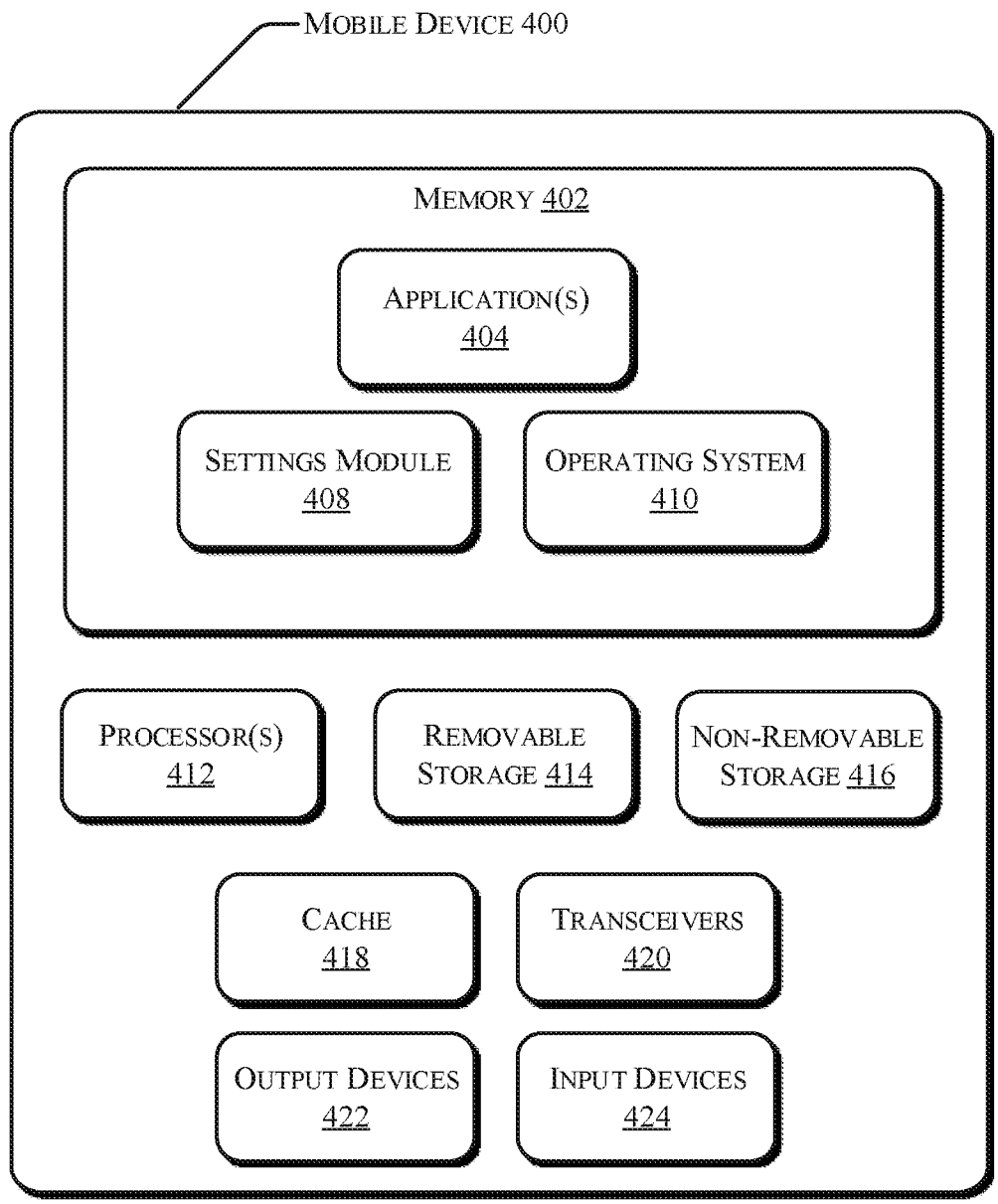
FIG. 4 schematically illustrates a component level view of an example mobile device configured for use in the wireless communication network of FIG. 1, in accordance with various configurations.

FIG. 4 schematically illustrates a component level view of a mobile device 400, such as UE 104, configured to function within wireless communication network 100. As illustrated, the mobile device 400 comprises a system memory 402, e.g., computer-readable media 146, storing application(s) 404, e.g., applications 150 and network location scanning application 152, a settings module 408, and an operating system 410. Also, the mobile device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416. Additionally, the mobile device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 400. Any such non-transitory computer-readable media may be part of the mobile device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna. Also, or alternatively, the transceivers 420 may include wireless modem(s) to may facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the mobile device 400 to define how the user wishes certain calls from third parties to be handled by the wireless communication network, as previously described herein.

Figure 5:
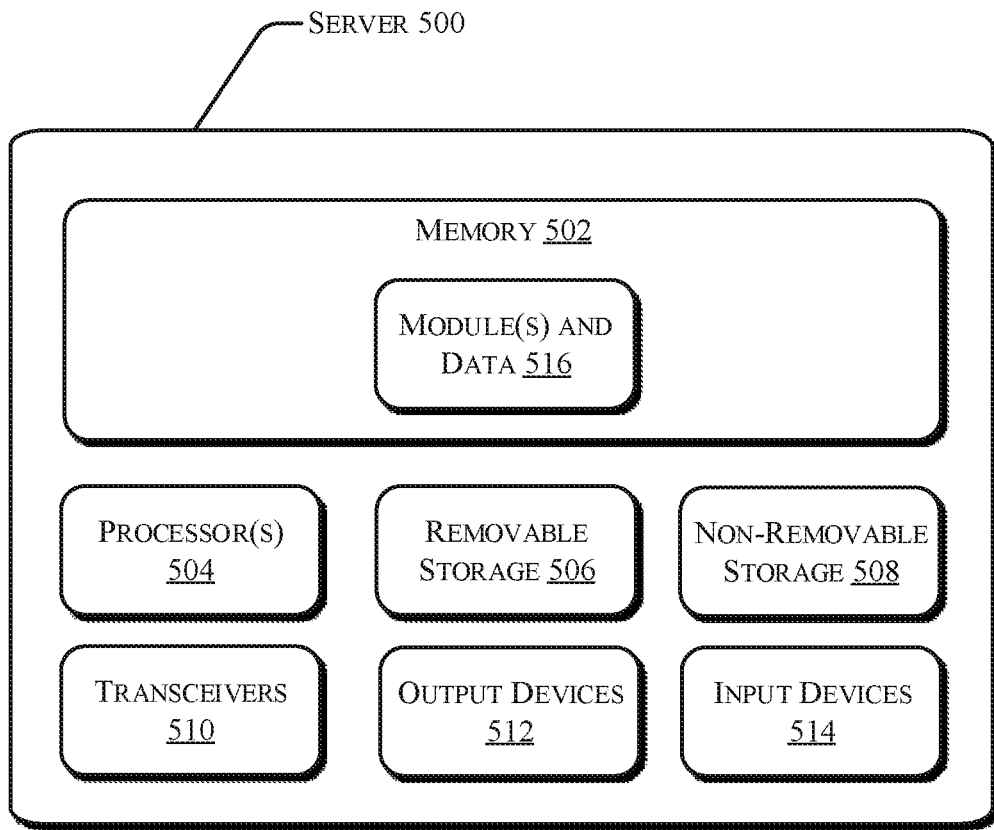
FIG. 5 schematically illustrates a component level view of a server configured for use in the arrangements of FIGS. 1, 2A and 2B to provide various services of the wireless communication network arrangements of FIGS. 1, 2A and 2B, in accordance with various configurations.

FIG. 5 illustrates a component level view of a server configured for use within a wireless communication network, e.g., wireless communication network 100 in order to provide various services within the wireless communication network, according to the techniques described herein. The server 500 may serve as the OSS server 108 or may be located in the RNC or gateway 110. As illustrated, the server 500 comprises a system memory 502 that may store data and one or more modules and/or applications 516 for interacting with mobile devices 400, e.g., UEs 104, as described herein. Also, the server 500 includes processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.) or some combination of the two. In some implementations, the processor(s) 504 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead, the transceivers 510 may include wireless modem(s) to may facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:
1. A method comprising:
 obtaining, by a mobile device, service from a first wireless communication network, the first wireless communication network being different from a second wireless communication network;
 based at least in part on obtaining the service from the first wireless communication network, periodically scanning, by the mobile device, for the second wireless communication network, the periodic scanning including repeating a scan based on a periodicity;

determining, by the mobile device, a location of the mobile device;

based at least in part on the location, determining, by the mobile device, a distance of the mobile device from the second wireless communication network;

based at least in part on the distance, determining, by the mobile device, a predetermined amount of time of a plurality of different predetermined amounts of time to delay further periodic scanning, by the mobile device, for the second wireless communication network, the periodicity being different from the plurality of different predetermined amounts of time; and based at least in part on the predetermined amount of time, delaying, by the mobile device, further periodic scanning, by the mobile device, for the second wireless communication network for at least the predetermined amount of time.

2. The method of claim 1, wherein the location is a first location, the distance is a first distance, the predetermined amount of time is a first predetermined amount of time and the method further comprises:

after the first predetermined amount of time, determining, by the mobile device, a second location of the mobile device;

based at least in part on the second location, determining, by the mobile device, a second distance of the mobile device from the second wireless communication network;

based at least in part on the second distance, determining, by the mobile device, a second predetermined amount of time of the plurality of different predetermined amounts of time to delay further periodic scanning, by the mobile device, for the second wireless communication network, the second predetermined amount of time being different from the first predetermined amount of time; and based at least in part on the second predetermined amount of time, delaying, by the mobile device, further periodic scanning, by the mobile device, for the second wireless communication network for at least the second predetermined amount of time.

3. The method of claim 1, wherein the location is a first location, the distance is a first distance, the predetermined amount of time is a first predetermined amount of time and the method further comprises:

prior to expiration of the predetermined amount of time, one of (i) powering off the mobile device or (ii) changing a mode of the mobile device from an active mode to a sleep mode;

subsequent to the one of (i) powering off the mobile device or (ii) changing the mode of the mobile device from the active mode to the sleep mode, one of (i) powering on the mobile device or (ii) changing the mode of the mobile device from the sleep mode to the active mode;

determining, by the mobile device, a second location of the mobile device;

based at least in part on the second location, determining, by the mobile device, a second distance of the mobile device from the second wireless communication network;

based at least in part on the second distance, determining, by the mobile device, a second predetermined amount of time of the plurality of different predetermined amounts of time to delay further periodic scanning, by the mobile device, for the second wireless communication network, the second predetermined amount of time being different from the first predetermined amount of time; and based at least in part on the second predetermined amount of time, delaying, by the mobile device, further periodic scanning, by the mobile device, for the second wireless communication network for at least the second predetermined amount of time.

4. The method of claim 1, wherein the location is a first location, the distance is a first distance, the predetermined amount of time is a first predetermined amount of time and the method further comprises:

after the predetermined amount of time, determining, by the mobile device, a second location of the mobile device;

based at least in part on the second location, determining, by the mobile device, a second distance of the mobile device from the second wireless communication network;

based at least in part on the second distance, determining, by the mobile device, to perform further periodic scanning without delaying; and based at least in part on the determination to perform further periodic scanning without delaying, further periodically scanning, by the mobile device, for the second wireless communication network.

5. The method of claim 4, further comprising:

based at least in part on the further periodic scanning, discontinuing obtaining service from the first wireless communication network; and obtaining service, by the mobile device, from the second wireless communication network.

6. The method of claim 1, wherein the location is a first location, the distance is a first distance, the predetermined amount of time is a first predetermined amount of time and the method further comprises:

receiving, by the mobile device, a list of two or more wireless communication networks, the list of two or more wireless communication networks including the first wireless communication network;

based at least in part on the list, determining, by the mobile device, a third wireless communication network from which to receive service;

periodically scanning, by the mobile device, for the third wireless communication network;

determining, by the mobile device, a second location of the mobile device;

based at least in part on the second location, determining, by the mobile device, a second distance of the mobile device from the third wireless communication network;

based at least in part on the second distance, determining, by the mobile device, a second predetermined amount of time of the plurality of different predetermined amounts of time to delay further periodic scanning, by the mobile device, for the second wireless communication network, the second predetermined amount of time being different from the first predetermined amount of time; and based at least in part on the second predetermined amount of time, delaying, by the mobile device, further periodic scanning, by the mobile device, for the third wireless communication network for at least the second predetermined amount of time.

7. The method of claim 6, further comprising:
after the second predetermined amount of time, determining, by the mobile device, a third location of the mobile device;
based at least in part on the third location, determining, by the mobile device, a third distance of the mobile device from the third wireless communication network;
based at least in part on the third distance, determining, by the mobile device, a third predetermined amount of time of the plurality of different predetermined amounts of time to delay further periodic scanning, by the mobile device, for the second wireless communication network, the third predetermined amount of time being different from the first predetermined amount of time and the third predetermined amount of time being different from the second predetermined amount of time; and
based at least in part on the third predetermined amount of time, delaying, by the mobile device, further periodic scanning, by the mobile device, for the third wireless communication network for at least the third predetermined amount of time.

8. The method of claim 6, wherein the location is a first location, the distance is a first distance, the predetermined amount of time is a first predetermined amount of time and the method further comprises:
after the predetermined amount of time, determining, by the mobile device, a second location of the mobile device;
based at least in part on the second location, determining, by the mobile device, a second distance of the mobile device from the third wireless communication network;
based at least in part on the second distance, determining, by the mobile device, to perform further periodic scanning without delaying; and
based at least in part on the determination to perform further periodic scanning without delaying, performing further periodic scanning, by the mobile device, for the third wireless communication network without delay.

9. The method of claim 8, further comprising:
based at least in part on the further periodic scanning, discontinuing obtaining service from the first wireless communication network; and
obtaining service, by the mobile device, from the third wireless communication network.

10. A mobile device comprising:
one or more processors;
a non-transitory storage medium; and
instructions stored in the non-transitory storage medium, the instructions being executable by the one or more processors to:
obtain service from a first wireless communication network, the first wireless communication network being different from a second wireless communication network;
based at least in part on the service obtained from the first wireless communication network, periodically scan for the second wireless communication network, the periodic scanning including repeating a scan based on a periodicity;
determine a location of the mobile device;
based at least in part on the location, determine a distance of the mobile device from the second wireless communication network;
based at least in part on the distance, determining, by the mobile device, a predetermined amount of time of a plurality of different predetermined amounts of time to delay further periodic scanning, by the mobile device, for the second wireless communication network, the periodicity being different from the plurality of different predetermined amounts of time; and
based at least in part on the predetermined amount of time, delay further scanning for the second wireless communication network for at least the predetermined amount of time.

11. The mobile device of claim 10, wherein the location is a first location, the distance is a first distance, the predetermined amount of time is a first predetermined amount of time and the instructions are further executable by the one or more processors to:
after the first predetermined amount of time, determine a second location of the mobile device;
based at least in part on the second location, determine a second distance of the mobile device from the second wireless communication network;
based at least in part on the second distance, determine a second predetermined amount of time of the plurality of different predetermined amounts of time to delay further periodic scanning, by the mobile device, for the second wireless communication network, the second predetermined amount of time being different from the first predetermined amount of time; and
based at least in part on the second predetermined amount of time, delay further periodic scanning for the second wireless communication network for at least the second predetermined amount of time.

12. The mobile device of claim 10, wherein the location is a first location, the distance is a first distance, the predetermined amount of time is a first predetermined amount of time and the instructions are further executable by the one or more processors to:
prior to expiration of the predetermined amount of time, one of (i) powering off the mobile device or (ii) changing a mode of the mobile device from an active mode to a sleep mode;
subsequent to the one of (i) powering off the mobile device or (ii) changing the mode of the mobile device from the active mode to the sleep mode, one of (i) powering on the mobile device or (ii) changing the mode of the mobile device from the sleep mode to the active mode;
determine a second location of the mobile device;
based at least in part on the second location, determine a second distance of the mobile device from the second wireless communication network;
based at least in part on the second distance, determine a second predetermined amount of time of the plurality of different predetermined amounts of time to delay further periodic scanning, by the mobile device, for the second wireless communication network, the second predetermined amount of time being different from the first predetermined amount of time; and
based at least in part on the second predetermined amount of time, delay further periodic scanning for the second wireless communication network for at least the second predetermined amount of time.

13. The mobile device of claim 10, wherein the location is a first location, the distance is a first distance, the predetermined amount of time is a first predetermined amount of time and the instructions are further executable by the one or more processors to:
after the predetermined amount of time, determine a second location of the mobile device;

based at least in part on the second location, determine a second distance of the mobile device from the second wireless communication network;
based at least in part on the second distance, determine the mobile device is to perform further periodic scanning, by the mobile device, without delaying; and
based at least in part on the determination to perform further periodic scanning without delaying, perform, by the mobile device, further periodically scan for the second wireless communication network.

14. The mobile device of claim 13, wherein the instructions are further executable by the one or more processors to:
based at least in part on the further periodic scanning, discontinue obtaining service from the first wireless communication network; and
obtain service from the second wireless communication network.

15. The mobile device of claim 10, wherein the location is a first location, the distance is a first distance, the predetermined amount of time is a first predetermined amount of time and the instructions are further executable by the one or more processors to:
receive a list of two or more wireless communication networks, the list of two or more wireless communication networks including the first wireless communication network;
based at least in part on the list, determine a third wireless communication network from which to receive service;
scan for the third wireless communication network;
determine a second location of the mobile device;
based at least in part on the second location, determine a second distance of the mobile device from the third wireless communication network;
based at least in part on the second distance, determine a second predetermined amount of time of the plurality of different predetermined amounts of time to delay further periodic scanning, by the mobile device, for the second wireless communication network, the second predetermined amount of time being different from the first predetermined amount of time; and
based at least in part on the second predetermined amount of time, delay further periodic scanning for the third wireless communication network for at least the second predetermined amount of time.

16. The mobile device of claim 15, wherein the instructions are further executable by the one or more processors to:
after the second predetermined amount of time, determine a third location of the mobile device;
based at least in part on the third location, determine a third distance of the mobile device from the third wireless communication network;
based at least in part on the third distance, determine a third predetermined amount of time of the plurality of different predetermined amounts of time to delay further periodic scanning, by the mobile device, for the second wireless communication network, the third predetermined amount of time being different from the first predetermined amount of time and the third predetermined amount of time being different from the second predetermined amount of time; and
based at least in part on the third predetermined amount of time, delay further periodic scanning for the third wireless communication network for at least the third predetermined amount of time.

17. The mobile device of claim 15, wherein the location is a first location, the distance is a first distance, the predetermined amount of time is a first predetermined amount of time and the instructions are further executable by the one or more processors to:
after the predetermined amount of time, determine a second location of the mobile device;
based at least in part on the second location, determine a second distance of the mobile device from the third wireless communication network;
based at least in part on the second distance, determine the mobile device is to perform further periodic scanning without delaying; and
based at least in part on the determination to perform further periodic scanning without delaying, perform further periodic scanning for the third wireless communication network without delay.

18. The mobile device of claim 17, wherein the instructions are further executable by the one or more processors to:
based at least in part on the further periodic scanning, discontinue obtaining service from the first wireless communication network; and
obtain service from the third wireless communication network.

19. A non-transitory storage medium comprising instructions stored thereon, the instructions being executable by one or more processors to:
obtain service from a first wireless communication network for a mobile device that includes the non-transitory storage medium, the first wireless communication network being different from a second wireless communication network;
based at least in part on the service obtained from the first wireless communication network, periodically scan for the second wireless communication network, the periodic scanning including repeating a scan based on a periodicity;
determine a location of the mobile device;
based at least in part on the location, determine a distance of the mobile device from the second wireless communication network;
based at least in part on the distance, determining a predetermined amount of time of a plurality of different predetermined amounts of time to delay further periodic scanning, by the mobile device, for the second wireless communication network, the periodicity being different from the plurality of different predetermined amounts of time; and
based at least in part on the predetermined amount of time, delay further periodic scanning for the second wireless communication network for at least the predetermined amount of time.

20. The non-transitory storage medium of claim 19, the location is a first location, the distance is a first distance, the predetermined amount of time is a first predetermined amount of time and the instructions are further executable by the one or more processors to:
after the predetermined amount of time, determine a second location of the mobile device;
based at least in part on the second location, determine a second distance of the mobile device from the second wireless communication network;
based at least in part on the second distance, determine the mobile device is to perform further periodic scanning, by the mobile device, without delaying;
based at least in part on the determination to perform further periodic scanning without delaying, perform, by the mobile device, further periodic scanning for the second wireless communication network without delay;

based at least in part on the further periodic scanning, discontinue obtaining service from the first wireless communication network; and obtain service from the second wireless communication network.

* * * * *